July 1, 1958 E. H. B. BARTELINK 2,841,640

COLOR TELEVISION SYSTEM

Filed Aug. 13, 1953 4 Sheets-Sheet 1

INVENTOR.
EVERHARD H. B. BARTELINK

BY H. S. Mackey

ATTORNEY

INVENTOR.
EVERHARD H.B. BARTELINK
BY H. A. Mackey
ATTORNEY

INVENTOR.
EVERHARD H.B. BARTELINK
BY H. A. Mackey
ATTORNEY

INVENTOR.
EVERHARD H. B. BARTELINK
BY H. L. Mackey
ATTORNEY

United States Patent Office 2,841,640

Patented July 1, 1958

2,841,640

COLOR TELEVISION SYSTEM

Everhard H. B. Bartelink, Concord, N. H., assignor to General Precision Laboratory Incorporated, a corporation of New York Application August 13, 1953, Serial No. 374,013

12 Claims. (Cl. 178—5.2)

This invention relates to color television systems and is particularly directed to such systems that are compatible with the present black-and-white television system.

It is desirable, for color television broadcasting purposes, to employ a system which will permit existing black-and-white receivers to receive the color television signals as black-and-white pictures. The ideal situation is to employ such a color system that existing receivers can, without modification, receive programs from the color transmitters. These receivers can then be tuned at will to either black-and-white transmitters or color transmitters. Such a system is termed a compatible system and constitutes the most complete protection to the current investment of the public in television receivers and therefore in this sense is a color television system which is most in the public interest.

Color television may be based on the principle of analyzing the light reflected or generated by the object to be televised by means of camera color filters responsive to the three primary colors of light. When additively combined in one particular proportion, these colors produce "white"; in other proportions they may produce all color-hues represented by such points in the color diagram as are located within the color triangle defined by the three primary colors. At the receiver similar filters or equivalents are interposed between the "black and white" face of a television receiving screen and the viewer to produce color sensation, or as an alternate arrangement a color kinescope may be used. The present invention is based on this principle, but is not concerned with the exact primary colors employed or their proportions. For example, the current recommendation of the authoritative television industry committee may be followed, alternatively, and other desired types and proportions of primary colors may also be employed. However, the present invention is concerned with the operation and the arrangement of the overall television transmission system from camera to viewing screen, and is equally applicable to all color systems employing additive colors.

There are three possible methods of sequential or time multiplex color television, sometimes termed field sequential, line sequential, and dot sequential methods. The first, the field sequential method, has certain advantages over the others but in the past it has been found impossible to design such a system employing the present standard method of scanning the television picture area and the corresponding synchronization frequencies without producing an objectionable amount of flicker. Higher rates of scanning the picture area, and in particular higher scanning frequencies have accordingly been used but the resulting systems have of course not been compatible with presently existing black-and-white receivers. In addition it has been necessary to reduce the detail resolution of such systems in order to remain within the current standards of bandwidth of video transmission channels.

The present invention, however, employs the field sequential method of color television in such a way that standard synchronization frequencies can be employed by making the durations of the red and blue fields less than the duration of the green field. The result is that the bandwidth required conforms to present bandwidth restrictions while the number of complete scans per second of the red, blue and green picture information, and therefore the flicker also conform to present standards. This invention thus provides a system which is basically compatible with the present systems of black-and-white television, its receivers being able to receive the color television transmissions as black-and-white pictures, while color television receivers are able to receive black-and-white transmissions as black-and-white pictures.

The present invention employs standard synchronization frequencies of 60 C. P. S. and 15,750 C. P. S., but within the time required to scan the 262½ horizontal lines employed in the present black-and-white system for one field, the apparatus of the present invention transmits three color fields. As a specific example, the green field may occupy 89% of the time of a black-and-white field and therefore, has 89% of the black-and-white definition in the vertical direction and equal definition horizontally. Such definition in color reproduction is satisfactory and approximately equal to present black-and-white definition. The red and blue fields may each occupy about 5% of the time of a black-and-white field and have correspondingly degraded definition, but sufficient to transmit color information. The green field then has a definition which is equal to the present black and white picture as far as the horizontal definition is concerned and of 89% of the present black and white picture as far as the vertical definition is concerned. The "green" component of the picture contains, in addition to the green color information and definition, all of the high frequency information secured by the red and blue fields, and consequently contains the full intensity information including the red and blue fine detail information.

In place of these specific values, other values may be employed without departing from the spirit of the invention, but approximately the above values are preferred as representing a reasonable compromise between resolution and faithful color reproduction while requiring no more video bandwidth than is allotted by present black-and-white television standards.

Conventional interlace is employed, i. e., consecutive sets of color fields scanning odd and even lines, in order to reduce the flicker in the same manner as in the present black-and-white system.

The color receiver used with the present invention may contain a color wheel or drum, three separate picture tubes, each with a different color phosphor or filter, the three pictures being optically combined, or it may contain a single tube having three colored phosphor layers, elements or patterns and employing a suitable cathode ray gun or guns for energizing them and suitable means for selecting between colors.

The main purpose of this invention then is to provide a field sequential color television system employing the method of mixed highs and generating a picture which is able to produce a black and white picture on a conventional black and white receiver.

More specifically, the purpose of this invention is to provide a compatible color television system having sequential color fields of unequal time duration and detail resolution, and employing synchronizing pulse frequencies equal to those of standard black-and-white television systems.

Still more specifically, the purpose of this invention is to provide a time sequential color television system which can operate synchronously with the present black-and-white television system, in which the green field, having a much longer duration than the red or blue fields, transmits all of the fine detail definition and intensity information, and in which the red and blue fields transmit the color information, such system being basically compatible with the black-and-white standards so that receivers of both systems can, without mannual adjustment, display pictures upon receipt of signals from either type of transmitter.

A further understanding of the invention may be secured from the detailed description and associated drawings, in which:

Figure 1 schematically depicts studio equipment utilizing the present invention.

The system of this invention is of the color field sequential type in which the primary colors, for example, red, blue, and green, follow each other in time sequence in that order. The time periods allotted to red and blue are equal and are very much shorter than the period allotted for green transmission. For example, in one complete picture, of 1/30 second, six color fields occur in the order of red, blue, green, red, blue, green. Each red field and each blue field occupies the time of 16½ horizontal line periods, and each green field occupies the time of 229½ horizontal line periods, these times including flyback time, and one horizontal line period is taken as being equal to 63½ microseconds. This time division is graphically illustrated in Fig. 3 at C, the abscissae representing time duration and the ordinates representing scanning current in the vertical deflection yoke of the picture tube.

The resulting color television picture has the same definition as present standard black and white pictures in the horizontal direction and has 89% of the vertical definition. In addition the color picture is shorter vertically by 11% or alternatively can have the same vertical dimension with 11% faster scanning.

Figure 1:
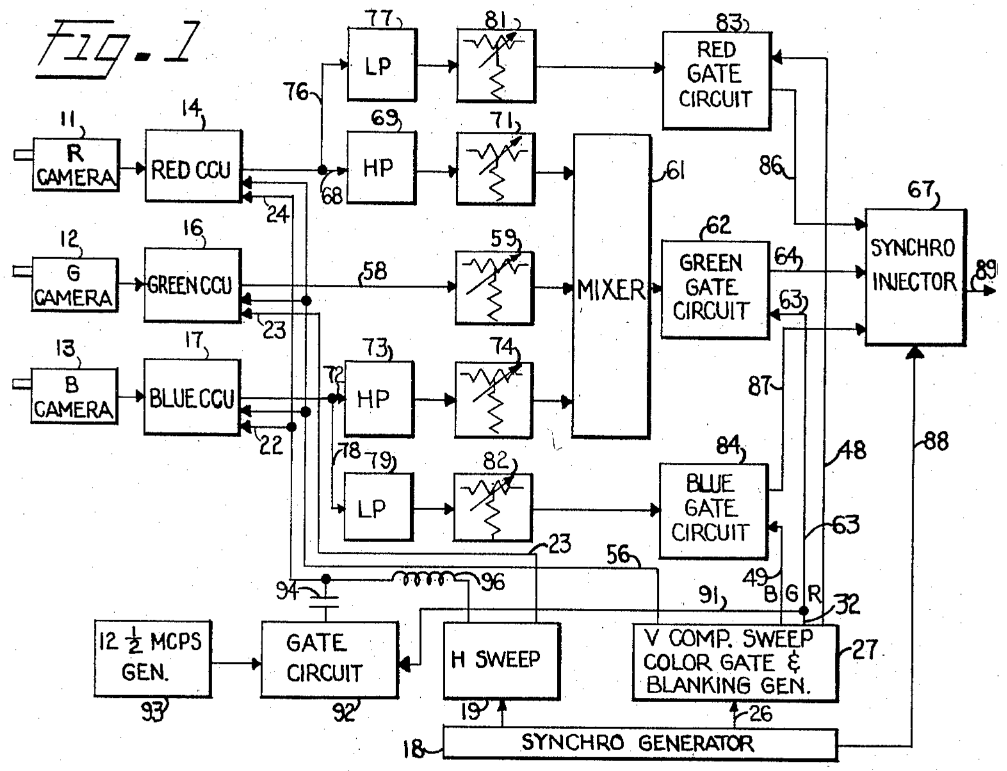

Referring now to Fig. 1, three television cameras 11, 12 and 13 are arranged with lens filters so that only the additive primary colors red, green and blue are passed by them respectively. Associated with each camera is a group of conventional components collectively termed the camera control unit and indicated at 14, 16 and 17. A synchronization pulse generator 18 generates vertical and horizontal synchronization pulses of the type now standard in the television industry, having a vertical frequency of 60 per second and a horizontal frequency of 15,750 per second, except that the vertical blank period is shortened to the equivalent of 9 horizontal lines. The horizontal driving pulses, horizontal blanking and composite synchronization pulses are used unmodified. The horizontal synchronization pulses are applied to a horizontal sweep circuit 19 of conventional type and the horizontal sawtooth sweep output is applied through conductors 21, 22, 23 and 24 to the three camera units 14, 16 and 17, causing them to scan their respective mosaic screens in synchronism and in phase. The vertical synchronizing signals are applied from the synchronization generator 18 through conductor 26 to a vertical sweep, color gate and blanking generator 27.

Figure 2:
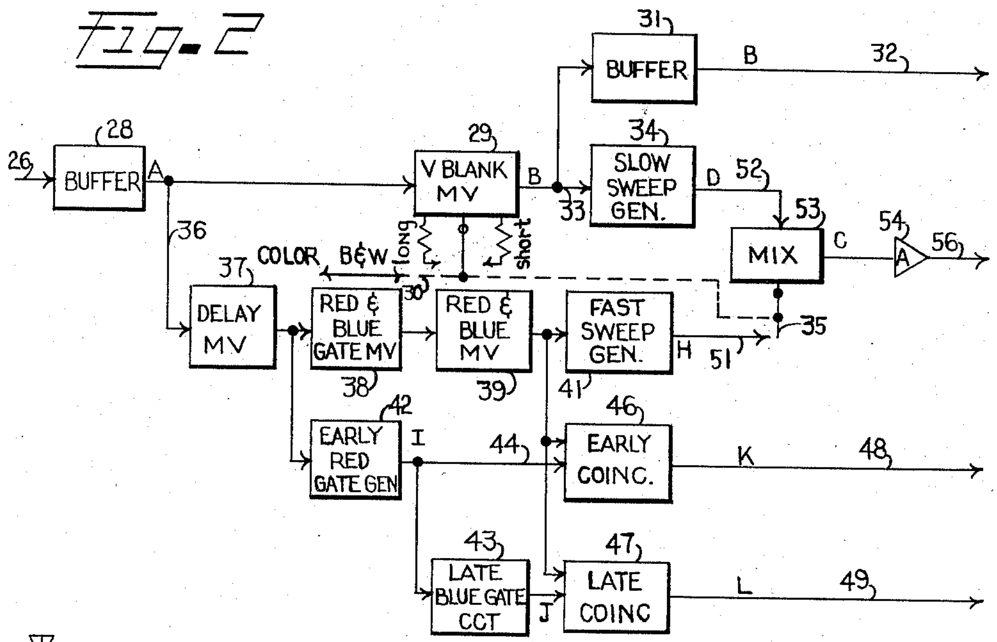
Figure 2 depicts a color gate generator utilized in the present invention.
Figure 3:
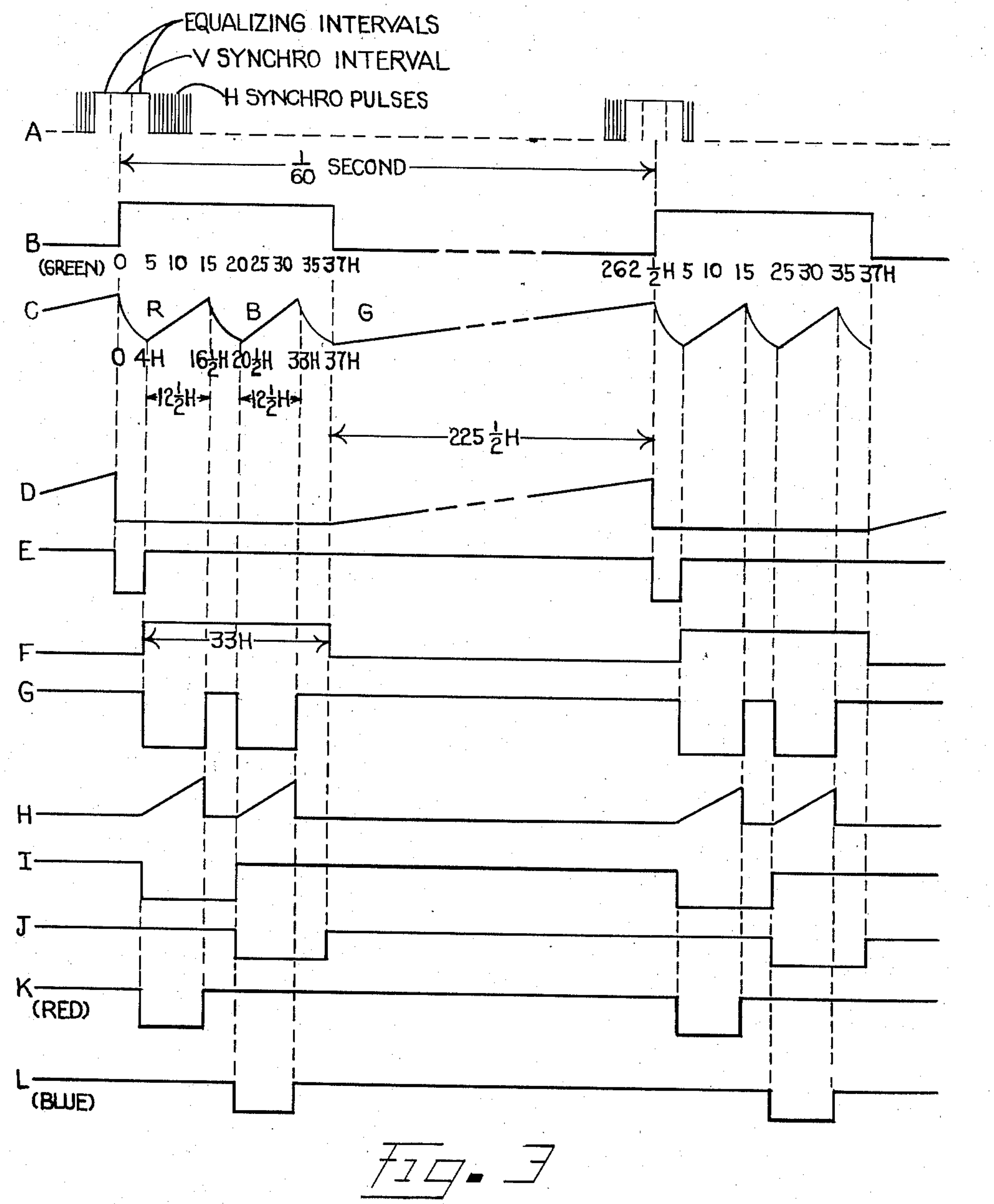
Figure 3 illustrates wave forms existing at selected points in the circuits and assist in understanding the operation of the instant invention.

The generator 27 is shown in greater deail in Fig. 2. After separation from the composite synchronization signal shown schematically in A, Fig. 3, the vertical synchronization signal is applied through conductor 26. This signal has conventional form and repetition rate. The signal is passed through a buffer stage 28, Fig. 2, to a multivibrator 29 which generates a vertical blanking signal, 37 horizontal line intervals in duration, each line interval having the approximate duration of 63½ microseconds. This blanking signal is shown at B, Fig. 3. It is employed as the green blanking gate and is transmitted through buffer stage 31 to conductor 32. The width of this gate is made such as to equal the width of the red and blue fields, as is illustrated in Fig. 3 at C, together with the retrace times for these fields and for the green field. As shown in this graph, the duration of the green retrace is from O to 4H, the red field has a duration of 12½H, followed by a 4H retrace from 16½ to 20½, and the blue field also has a duration of 12½H, followed by a 4H retrace from 33 to 37H (the term H being taken as the duration of one horizontal line interval).

A switch 30 may be provided for changing the video transmitter from color to black and white transmission. This is very simply done by moving the switch 30 to the right to change the blanking period of multivibrator 29 from 37 horizontal scanning intervals to the standard black and white period of 17 such intervals and at the same time opening the red and blue field transmission line at switch 35.

The 37H rectangular pulse output of the multivibrator 29 is also applied through conductor 33 to a slow sweep generator 34, and the trailing edge of the gate of wave form B is used to trigger this generator. The generator 34 thereupon produces a sawtooth sweep having a duration of 225½ horizontal line intervals which is terminated by the front of the next green blanking gate. This sawtooth wave form is schematically shown at D, Fig. 3.

The output of buffer 28 is also applied through conductor 36 to a delay multivibrator 37 which generates a gate having a width of 4 horizontal line intervals, shown at E, Fig. 3. The trailing edge of this gate is differentiated to trigger a red-and-blue field gate multivibrator 38, Fig. 2. The output gate of the multivibrator 38 is 33 horizontal line intervals wide and is shown at F, Fig. 3. The leading edge of this gate triggers a free-running multivibrator 39, Fig. 2, having a duration of 12½ horizontal line intervals in one state and 4 horizontal line intervals in the other. This multivibrator is turned off by the trailing edge of the gate F, and its consequent output form is shown by wave form G. This wave form is applied to a fast sweep generator 41 which generates one complete vertical sweep during each of the 12½ horizontal line interval gates of the multivibrator 39. The output of the fast sweep generator 41 is illustrated by the wave form H, Fig. 3.

The differentiated trailing edge of the gate E, having a duration of 4 horizontal line intervals, emitted by the delay multivibrator 37 also triggers an early gate generator 42 that emits a gate signal having a duration of 16 horizontal line intervals. The trailing edge of this gate in turn triggers another similar late gate generator 43 that also emits a gate signal whose period of duration is 16 horizontal line intervals. These gates are illustrated by the wave forms I and J of Fig. 3. The gate signal I is applied through conductor 44 to an early coincidence circuit 46 to which is also applied the output of the multivibrator 39 having the wave form G. During the coincidence of these two gates the early coincidence circuit emits a gate similar to the first part of the wave form G, having a duration of 12½ horizontal line intervals. This is the red gate as illustrated by K in Fig. 3. A similar late coincidence gate circuit 47 is fed from the multivibrator 39 and gate generator 43 and emits a gate that is similar but occurs later. This is the blue gate and is illustrated by the wave form L, Fig. 3. The two gates K and L are transmitted through the separate circuit conductors 48 and 49 respectively.

The fast sawtooth wave forms H and the slow sawtooth wave form D are transmitted from the fast sweep generator 41 and the slow sweep generator 34 through conductors 51 and 52 respectively to a mixing circuit 53, where they are combined to form the composite sawtooth form as illustrated by the wave form C, in which two consecutive sawtooth forms, each having a duration of 12½ horizontal line intervals, are followed by a single slow sawtooth form having a duration of 225½ horizontal line intervals. This composite form is amplified in an amplifier 54 having an output conductor 56.

This composite vertical sweep sawtooth voltage is applied to all three camera control units so that the pickup tubes associated with each are scanned vertically in identical fashion. This is indicated in Fig. 1 by the conductor 56 connecting the color gate generator 27 with the three camera control units 14, 16 and 17.

The output of the green camera control unit 16 is applied through conductor 58 and an amplitude adjusting unit 59 to a mixer 61. From mixer 61 the signal is applied to a green gating circuit 62. At this point the signal contains in the time sense all three color fields with full detail as seen through the green filtered camera and occupies the full width video band from zero to 4 megacycles. However, because of the extremely fast vertical scan during the red and blue field periods, this signal if viewed will be seen to have 25 intensified scanning lines which are the result of the blue and red scans. These lines are removed at this point by blanking out the red and blue fields, using the green blanking gate signal B, Fig. 3. This gate signal is applied from the generator 27 through conductors 32 and 63, Fig. 1, to the green gating circuit 62, where by use of well known coincidence circuits only that part of the signal included between the times 37H and 262½H, as shown in graph B, is permitted to pass. This signal is transmitted through conductor 64 to the composite synchronization signal injection circuit 67.

The signal carried by conductor 64 includes all coarse and fine details of the green picture, but in addition it is desirable also to include in this signal all brightness information pertaining to the fine detail in the red and blue part of the picture. In order to secure this information it is therefore necessary to add high frequency components from the red and blue fields. The addition of high frequency components from the blue field may not add sufficient information to the overall effect to warrant its inclusion, in which case it may be omitted, but in the present example it is preferred to add both red and blue high frequency components.

The output of the red camera control unit 14, Fig. 1, is passed through conductor 68 to a high pass filter 69. This filter may, for example, have a range of 0.25 to 4.0 mc. p. s. This signal, including lines scanned by camera 11 during the green vertical scan period, is passed through an amplitude adjuster 71, then mixed in the mixer 61 with the complete green signal. This added signal contributes to the brightness component those details of the object that are seen by the red camera but not by the green camera.

Similarly the output of the blue camera control unit 17 is passed through conductor 72 to a filter 73 passing high frequency signals for instance in the range of 0.25 to 4.0 mc., and through an amplitude adjuster 74 to the mixer 61, where it is mixed with the other signals to form the complete brightness signal. It is to be noted that since these signals are green-gated, only the highs that are seen by the red and blue cameras during the green field time period are utilized.

During the red and blue fields, because of the rapid vertical sweeps, the scanning process is effectively that of a low resolution picture which, for equal horizontal and vertical resolution, would require only a narrow band of frequencies for its transmission such as, for example, a band of 0.25 mc. p. s. These red and blue signals are transmitted through low pass filters which remove the high frequency components. This is accomplished by passing the output of the red camera control unit through conductor 76 to a low pass filter 77, passing all frequencies up to, for instance, 0.25 mc. p. s., and bypassing the output of blue camera control unit 17 through conductor 78 to a similar filter 79. However, the crossover frequency of 0.25 mc. p. s. need not be adhered to strictly; at crossover the high and low pass transmissions may overlap somewhat, and in practice they nearly always do to a greater or less extent.

The outputs of these filters are passed through amplitude adjusters 81 and 82 respectively to red and blue gate circuits 83 and 84 respectively. By use of coincidence circuits the red gate circuit 83 is permitted to produce an output only during the red gate time shown by the wave form K, Fig. 3, by application of the red gate signal from the color gate circuit 27 through conductor 48, and the blue gate circuit 84 is permitted to produce an output only during the blue gate time shown by the wave form L, Fig. 3, by application of the blue gate signal from the color gate circuit 27 through conductor 49. The outputs of the red and blue gate circuits 83 and 84 are applied through conductors 86 and 87 to the composite synchronization signal injection circuit 67, where these outputs are mixed in a time sense with the gated green signal to produce time sequential color fields.

The composite horizontal and vertical synchronization signal is conventionally applied from the synchronization signal generator 18 through conductor 88 to the composite synchronization signal injection circuit 67, where it is combined with the 3-color field video signal to form the complete signal in output conductor 89.

As stated, the brightness information as well as information regarding fine details of the picture are transmitted in the green field, leaving to the red and blue low frequency fields the function of adding color. These fields must, however, be blurred in some way to prevent the formation of discrete lines in the receiver during red and blue fields, and to prevent the television camera from giving erroneous information. To understand what may happen in the camera tube, consider an extreme example. If the camera is sharply enough focused to pick up the fine detail, and the picture is not blurred by spot wobble or otherwise during the red and blue fields, the camera beam may conceivably scan a narrow, horizontal black line in an otherwise saturated red field. The camera would thus transmit black information while if spot wobbled it would transmit 95% saturated red.

To eliminate these effects, it is necessary not only to employ low pass filters 77 and 79, but also to use the well-known technique of vertical spot wobble (or equivalent techniques) in the red and blue cameras. To accomplish this, the green gate output of the color gate circuit 27 is employed. Through conductor 91 this gate is applied to a gate circuit 92 which together with a 12½ mc. p. s. generator 93 comprises the spot wobble circuit. The generator 93 applies its output to the gate circuit 92, and during the inverted green gate, from 0 to 37H in B, Fig. 3, the output is permitted to pass through gate circuit 92, and through coupling condenser 94, so that this output is superimposed on the horizontal sweep voltage output of the sweep circuit 19 and is applied to the red and blue camera chain units through conductors 22 and 24. The choke 96 prevents the 12½ mc. p. s. frequency from entering the horizontal sweep circuit 19. The voltage magnitude of the wobble circuit is made sufficient to span the distance between horizontal lines.

The description of camera equipment as illustrated in Fig. 1 is merely by way of example, and numerous other conventional optical and circuit arrangements may be employed in place of the one described. For example, a single camera 97, Fig. 4, may be employed on a time-sharing basis to scan the colored fields in turn, by rotating a filter disc or drum 98 between the object lens and the object. One advantage of this method lies in the possibility of making the red and blue filters of light-diffusing or translucent material, so that the definition of these fields is degraded to produce the required averaging effect, thus eliminating the necessity for spot wobble at the expense of losing the red and blue detail. This method of operation may be quite acceptable for field pickup and materially simplifies the camera equipment. The disc 98 is rotated by motor 99, and a synchronization signal generator 18 applies synchronizing pulses to control motor equipment 101 so that the wheel 98 turns at a speed of 30 R. P. M. properly phased. The camera control circuit 102 is swept horizontally and vertically in a color field raster as previously described, and the output is controlled in amplitude and time-separated by use of a color gate generator 27 and red, green and blue gate circuits 83, 62 and 84 as previously described. The outputs are mixed in mixer 67A in a time sense to form sequential color fields in a single circuit, and the synchronization signal is added at 67 to form an output at conductor 89.

It is obvious that present standard black-and-white receivers can be modified to receive the color signal of the present invention as black and white signals if an additional tube be added to introduce a vertical blanking period of 37 horizontal line intervals in duration, the blanking being triggered by the vertical synchronizing or driving pulse, so that the picture tube blanking has the necessary length to eliminate the rasters resulting from the red and blue scans that otherwise would mar the picture. A simple switch can disable the added tube for standard black-and-white signal reception.

Figure 5:
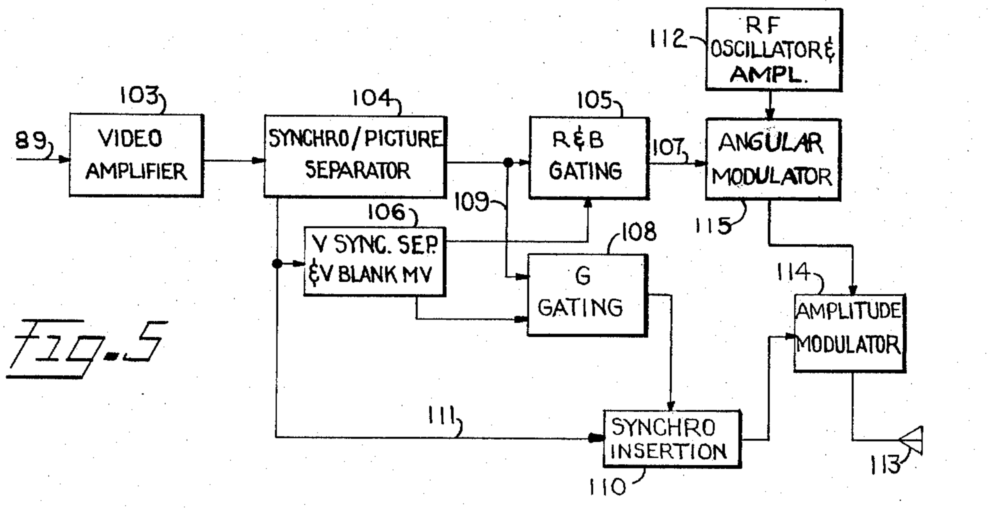
Figure 5 is a schematic illustration of a ratio transmitter utilizing the principle of the invention.

A radio transmitter for use with this system and emitting signals usable either by the color receivers of this invention or by conventional black-and-white receivers basically without modification is shown in Fig. 5. Complete video and synchronization signals from studio equipment as shown in Fig. 1 or from a radio relay link or a coaxial transmission line are received at conductor 89 and amplified at 103. The video signals are separated at 104 and applied to a gating circuit 105. The vertical and horizontal synchronizing signals are applied to a vertical synchronizing signal separating and blank generating circuit 106, where a green gate as shown at B, Fig. 3, is generated and applied to the gating circuit 105. This circuit then permits passage of the video signal during the red and blue gate periods but denies passage during the green gate periods. Thus the output conductor 107 carries the red and blue low frequency picture intelligence only.

The output of the separator circuit 106 is also applied to an inverted green gate generator 108 to which the video signals are also applied through conductor 109 with such polarity that these video signals are passed only during the green gate period. The output signals are applied to a synchronization insertion circuit 110, to which the vertical and horizontal synchronizing signal outputs of separator circuit 104 are also applied through conductor 111. The output consists of the complete signal emitted during the green field period.

A radio frequency oscillator and amplifier 112 operating at the assigned radio transmission frequency is associated with a television transmitting antenna 113. Between the transmitter and the antenna there are two modulators 114 and 115 connected in tandem, modulator 114 being for amplitude modulation and modulator 115 being for angular modulation, that is, for either frequency or phase modulation. The amplitude modulator 114 is excited from the radio frequency amplifier and is connected to circuit 110, so that during the green gate period the antenna 113 output is amplitude modulated and during the rest of the time black is transmitted. That is, full transmitter amplitude is emitted. The synchronization signals are transmitted by amplitude modulation at all times. The angular modulator 115 is excited from the radio frequency amplifier and is connected to conductor 107, so that during the red and blue field periods the output is angularly modulated while at other times it is not.

As a result, the output would appear on a black-and-white receiver as an excellent black-and-white rendition of the green gate information, reduced in the vertical dimension by the amount that the green blanking signal is larger than the conventional vertical blanking signal. Also, the output would appear on a color receiver with the same line detail in the green period but, in addition, with reception and angular demodulation of the red period and blue period information to furnish the red and blue color components.

No sound transmitter is described or depicted as its design is conventional.

Figures 4, 6:
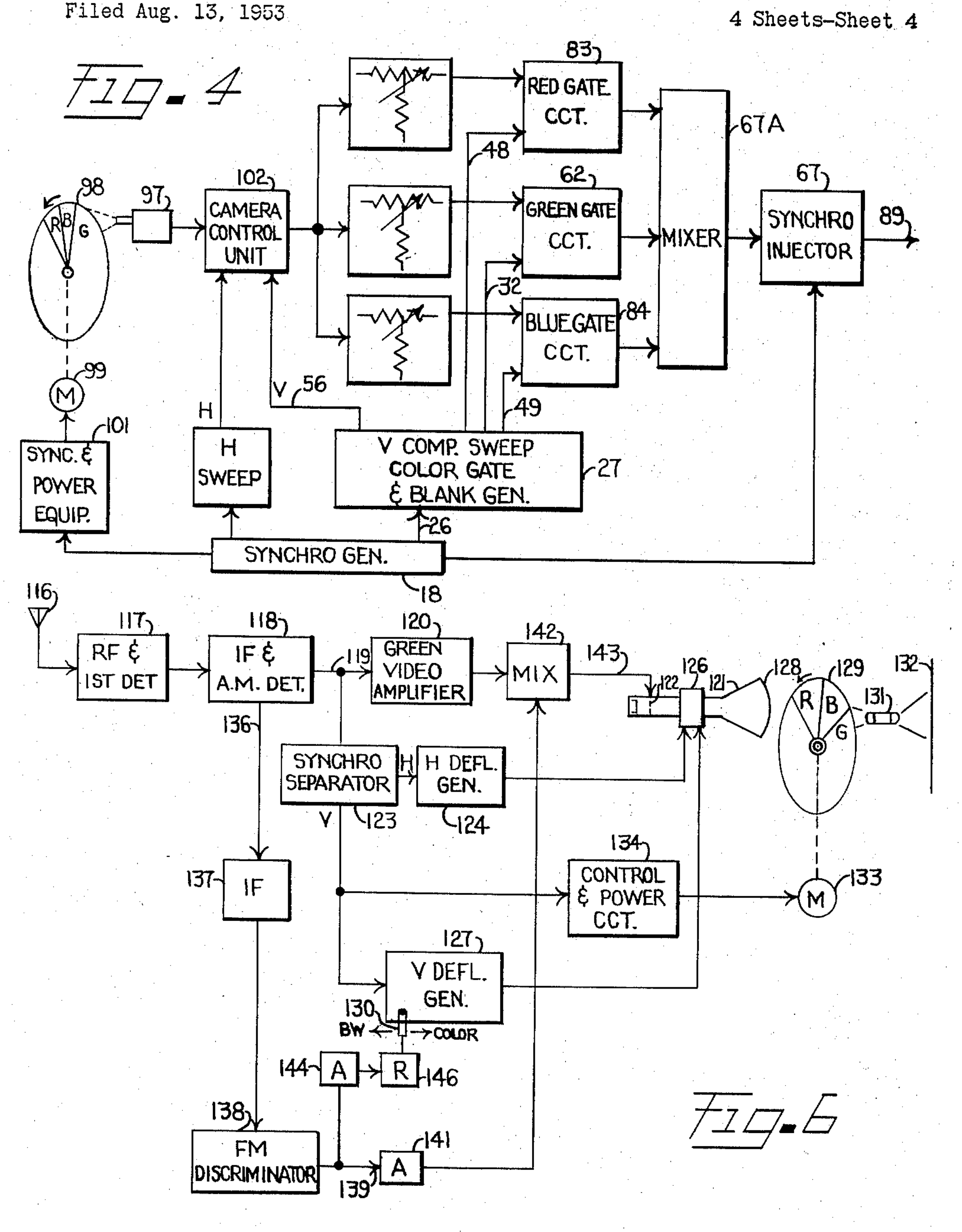
Figure 4 depicts studio equipment using a single camera and a color wheel.

One form of color system receiver employing a color wheel or drum is schematically shown in Fig. 6. The radio frequency input signal is received from antenna 116 and applied to the radio frequency amplifier and first detector 117, and from it the signal is applied to an intermediate frequency amplifier followed by an amplitude demodulator or second detector 118. The output at conductor 119 contains the amplitude-demodulated video signal. This video signal is applied to a conventional 0–4MC video amplifier 120 and from it through a mixer 142 to an intensity control electrode of a cathode ray tube 121 which may, for example, be the control grid 122.

The composite synchronization signal is separated from the video picture information by a synchronization signal separator 123 and the horizontal synchronization signal component is applied to a deflection voltage generator 124. The resulting scanning voltage, which is identical to that used in a black-and-white receiver is applied to a magnetic deflection yoke 126 to generate the horizontal scanning lines. The vertical synchronizing signals are applied to a vertical sweep generator 127 adjusted by means of the switch 130 to generate conventional vertical driving voltages, thus applying the proper vertical scanning voltages to the yoke 126 for reproduction of black and white signals.

As so far described the receiver is conventional. If the input signal is of the conventional black-and-white type, having a vertical blank interval of about 20 horizontal line intervals, and if the color disk is removed, or its sectors collapsed, black-and-white pictures will be reproduced on the fluorescent screen 128 and projected on screen 132. The color television system is therefore compatible with present black-and-white television standards, which is to say that the above described color receiver can be used without change to receive black-and-white television signals with good results.

The receiver as described, however, also contains several components for use on color signals only. The principal component is a color disc or drum, schematically indicated at 129, provided with red, blue and green color filters and rotated to bring them between the fluorescent screen 128 and a projection system 131 and screen 132 in that order at the rate of one complete set of three color fields every $\frac{1}{60}$ second. The disc or drum may of course, carry only one set of filters or may carry a plurality of filters with a corresponding decrease in its synchronous speed. The disc or drum is rotated at the required speed by a motor 133 and control and power circuit 134, the latter being controlled by the vertical synchronizing pulses secured from the synchronization signal separator circuit 123.

The receiver is also provided with circuit arrangements which accept the received red and blue color information in their time sequence relationship to the green field information and utilize these color information field signals to modify or modulate the potential of the mixer 142 at such times as the green field video amplifier 119 applies a black level potential to the control electrode 122 through the mixer 142.

This is accomplished by deriving the red and blue signal informtion from the intermediate frequency amplifier 118 through the conductor 136, additionally amplifying this signal in an amplifier 137 if necessary, and applying this signal to a frequency modulation discriminator 138. The output at conductor 139 is then an amplitude modulated signal synchronous in time with the red and blue fields and having a modulation function proportional to the zero to 0.25 mc. p. s. modulation of these fields at the studio. This signal is amplified by an amplifier 141 and applied through the mixer 142 to the control electrode 122 of the picture tube 121.

Thus the conductor 143 applies information to the electrode 122 on a time-shared or consecutive basis. When the disc 129 interposes its red sector in the light beam the time thereof coincides with the period during which the red demodulated signal is applied from amplifier 141 through mixer 142 to the electrode 122. Similarly, the positioning of the blue sector in the light beam occurs while blue field information is being applied to the electrode 122, and the passage of the green sector coincides with the transmission from the green video amplifier 120 of the green field intelligence.

In producing color signals the switch 130 is automatically actuated by a relay 146. Upon actuation of the frequency discriminator 138 its output energy is amplified and rectified by an amplifier 144 which in turn actuates relay 146 through time delay circuits to move the switch 130 to the "color" position. This changes the circuits in the vertical deflection generator 127 from the conventional black-and-white type of circuit to that indicated in Fig. 2, including three vertical scanning sawteeth in each 1/60 second period. The raster applied to the picture tube 121 is then that required and previously described in connection with Fig. 3 for proper display of the color picture.

Figure 7:
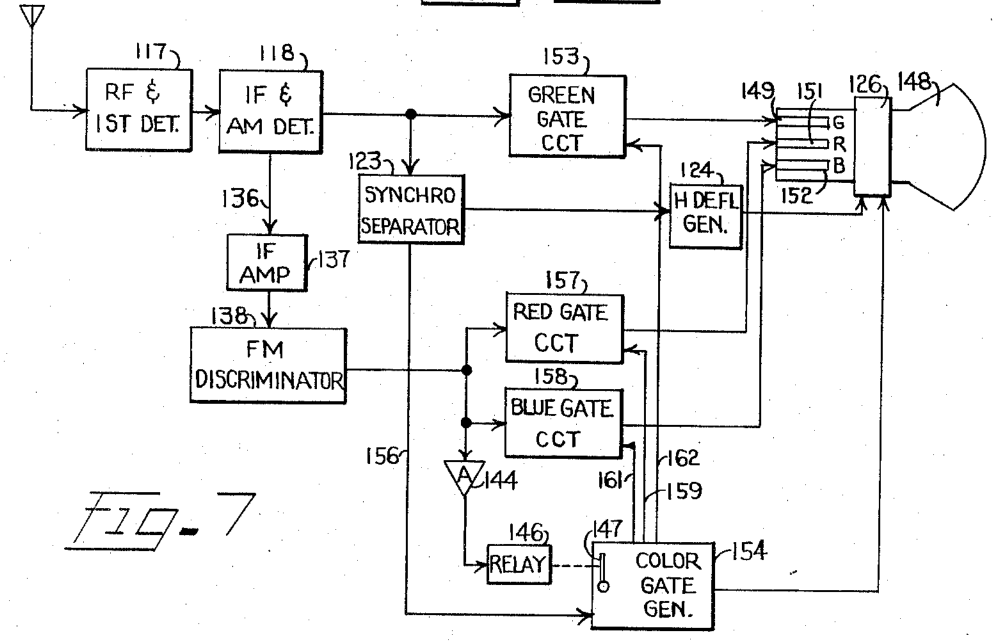
Figures 6 and 7 depict two types of receiver utilizing the principle of the invention.

The instant invention may be employed with the 3-color picture tube, for instance one having three cathode ray guns and a phosphor coating that appears red, blue or yellow depending upon which of the guns excite it. Such a tube is shown at 148, Fig. 7, having three electron guns 149, 151 and 152. The input signal is amplified and demodulated by a radio frequency amplifier and first detector 117, and amplified at intermediate frequency and amplitude-detected by the intermediate frequency amplifier and second detector 118. The video-frequency-band output is gated by a green field gate circuit 153 to remove the red and blue video signals and the remaining complete green signal is applied to the green electron gun 149. A synchronization signal separator circuit 123 applies the horizontal synchronization signal to the horizontal deflection generator 124, which causes the tube 148 to be scanned magnetically by means of the yoke coil 126. The intermediate frequency signal is applied from the intermediate frequency amplifier 118 through conductor 136 to an intermediate frequency amplifier 137 and a frequency modulation discriminator 138. Vertical deflection and color gate signals are generated by a circuit similar to that shown in Fig. 2 and schematically indicated in Fig. 7 by the color gate generator 154. This gate generator is triggered by vertical synchronization signals received through conductor 156 from the synchronization signal separator 123.

A red gate circuit 157 and blue gate circuit 158 are coincidentally gated by red and blue gate signals transmitted through conductors 159 and 161 respectively from the color gate generator 154. The green gate circuit is similarly gated through conductor 162. The output of the discriminator 138 consists of the red and blue field video information and is applied to the red and blue gate circuits 157 and 158, which permits it to pass in proper consecutive order to the red and blue electron guns 151 and 152. The discriminator output is also amplified and rectified by an amplifier 144, which contains delayed action holdover circuits, and applied through relay 146 to a switch 147 in the color gate generator to change the length of the vertical green scan and of the vertical blank, and to generate short red and blue scans, thus providing automatic readiness to receive either color or black-and-white pictures as described in connection with Fig. 6.

What is claimed is:

1. A color television system comprising, means for separating the light image of a subject to be reproduced into a plurality of color components, cathode ray tube means for converting said color components to electrical signals, means for generating a sawtooth wave having a relatively long time duration, means for generating a pair of successive sawtooth waves each having a relatively short time duration, means for combining said long and short duration sawtooth waves in time sequence relation to produce a combined wave train of short and long duration sawtooth waves, means for vertically scanning said cathode ray tube means by said combined wave train, means for transmitting electrical signals representative of one of said color components only during the occurrence of said long duration sawtooth wave, and means for transmitting electrical signals representative of respective other ones of said color components only during the occurrence of respective ones of said short duration sawtooth waves.

2. A color television system comprising, means for separating the light image of a subject to be reproduced into a plurality of color components, cathode ray tube means for converting said color components to electrical signals, a synchronizing generator, means operated by signals derived from said synchronizing generator for horizontallly scanning said cathode ray tube means at a constant rate, means operated by signals derived from said synchronizing generator for generating a sawtooth wave having a relatively long time duration, means operated by signals derived from said synchronizing generator for generating a pair of successive sawtooth waves each having a relatively short time duration, means for combining said long and short duration sawtooth waves in time sequence relation to produce a combined wave train of short and long duration sawtooth waves, means for vertically scanning said cathode ray tube means by said combined wave train, means for transmitting electrical signals representative of one of said color components only during the occurrence of said long duration sawtooth wave, means for transmitting electrical signals representative of respective other ones of said color components during respective ones of said short duration sawtooth waves producing a time sequential color transmission signal, and means for combining synchronizing signals derived from said synchronizing generator with said time sequential color transmission signal to produce a composite signal.

3. A color television system as defined in claim 2 including means for diffusing the horizontal scan of said cathode ray tube means only during the time of application of said short duration sawtooth waves thereto.

4. A color television system comprising, means for separating the light image of a subject to be reproduced into a plurality of color components, cathode ray tube means for converting said color components to electrical signals, a synchronizing signal generator, means operated by synchronizing signals derived from said generator for horizontally scanning said cathode ray tube means at a constant rate, means operated by synchronizing signals derived from said generator for generating a sawtooth wave having a relatively long time duration, means operated by synchronizing signals derived from said generator for generating a pair of successive sawtooth waves each having a relatively short time duration, means for combining said long and short duration sawtooth waves in time sequence relation to produce a combined wave train of short and long duration sawtooth waves, means for vertically scanning said cathode ray tube means by said combined wave train, means for transmitting electrical signals representative of one of said color components only during the occurrence of said long duration sawtooth wave, means for combining synchronizing signals derived from said generator with said transmitted signals to produce a composite signal, means for amplitude modulating said composite signal, means for transmitting electrical signals representative of respective other ones of said color components during respective ones of said short duration sawtooth waves, means for angularly modulating said last mentioned transmitted signals, and means for combining said angularly modulated signals and said amplitude modulated signals.

5. A color television system as defined in claim 4 including means for diffusing the horizontal scan of said cathode ray tube means only during the time of application of said short duration sawtooth waves thereto.

6. A color television system comprising, means for separating the light image of a subject to be reproduced into a plurality of color components, cathode ray tube means including beam deflecting circuits, means for separately impressing said color components on said cathode ray tube means, means for generating a sawtooth wave train comprising successive sawtooth waves one of which is of relatively long duration and the remainder of which are of relatively short duration, means for impressing said wavetrain on said deflecting circuits, means for transmitting signals representative of one of said color components only during the interval of said long duration sawtooth wave, and means for transmitting signals representative of respective remaining ones of said color components only during the respective intervals of said short duration sawtooth waves.

7. A color television system comprising, means for separating the light image of a subject to be reproduced into three basic color components, cathode ray tube means, beam deflecting circuits therefor, means for separately impressing said color components on said cathode ray tube means, means for generating a sawtooth wave train consisting of a pair of successive sawtooth waves of relatively short duration followed by a sawtooth wave of relatively long duration, means for impressing said wave train on said deflecting circuits, means for transmitting signals representative of one of said color components only during the interval of said long duration sawtooth wave, and means for transmitting signals representative of respective remaining ones of said color components only during the respective intervals of said pair of short duration sawtooth waves.

8. A color television system as defined in claim 7 in which the time interval of said long duration sawtooth wave is at least ten times the time interval of a short duration sawtooth wave.

9. A color television system comprising, means for separating the light image of a subject to be reproduced into three color components, cathode ray tube means, beam deflecting circuits therefor, means for separately impressing said color components on said cathode ray tube means, means for generating a sawtooth wave train comprising successive sawtooth waves one of which is of relatively long duration followed by a pair of waves of relatively short duration, means for impressing said wave train on said deflecting circuits, means for separating the high frequency portions of signals representative of two of said color components from the low frequency portions thereof, means for mixing at least one high frequency portion with the entire signal representative of the third color component to provide a mixed signal, means preventing transmission of said mixed signal except during the interval of said long duration sawtooth wave, and means for transmitting the low frequency portions of the signals representative of said two color components only during the respective intervals of said short duration sawtooth waves.

10. A color television system comprising, means for separating the light image of a subject to be reproduced into three color components, a cathode ray tube means for producing signals representative of each of said color components, beam deflecting circuits for said cathode ray tube means, means for generating a sawtooth wave composed of a pair of successive waves of short duration followed by a wave of long duration, means impressing said wave train on said deflecting circuits, means for segregating the high frequency portions of the signals representative of two of said color components from the low frequency portions thereof, means for mixing the high frequency portions of said signals with the entire signal representative of said remaining color component producing a mixed signal, means transmitting said mixed signal only during the time of duration of said long duration sawtooth wave, and means transmitting the low frequency portions of the signals representative of said two color components only during the respective times of duration of said short duration sawtooth waves.

11. A color television system as defined in claim 10 in which the time of duration of said long duration sawtooth wave is at least ten times the time of duration of a short duration sawtooth wave.

12. A color television system as defined in claim 11 in which the high frequency portions of said signals are encompassed in the range of 0.1 to 4.0 megacycles per second and the low frequency portions thereof are encompassed in the range of 0 to 0.25 megacycle per second.

References Cited in the file of this patent

UNITED STATES PATENTS

| | | |
|---|---|---|
| 2,333,969 | Alexanderson | Nov. 9, 1943 |
| 2,554,693 | Bedford | May 29, 1951 |
| 2,558,489 | Kalfaian | June 26, 1951 |
| 2,663,756 | Kalfaian | Dec. 22, 1953 |
| 2,677,720 | Bedford | May 4, 1954 |
| 2,677,721 | Bedford | May 4, 1954 |